April 25, 1967

W. A. LANNOM 3,315,415

BEVEL EDGING DEVICE

Filed Aug. 11, 1964

INVENTOR
WILLIAM A. LANNOM
BY
ATTORNEYS

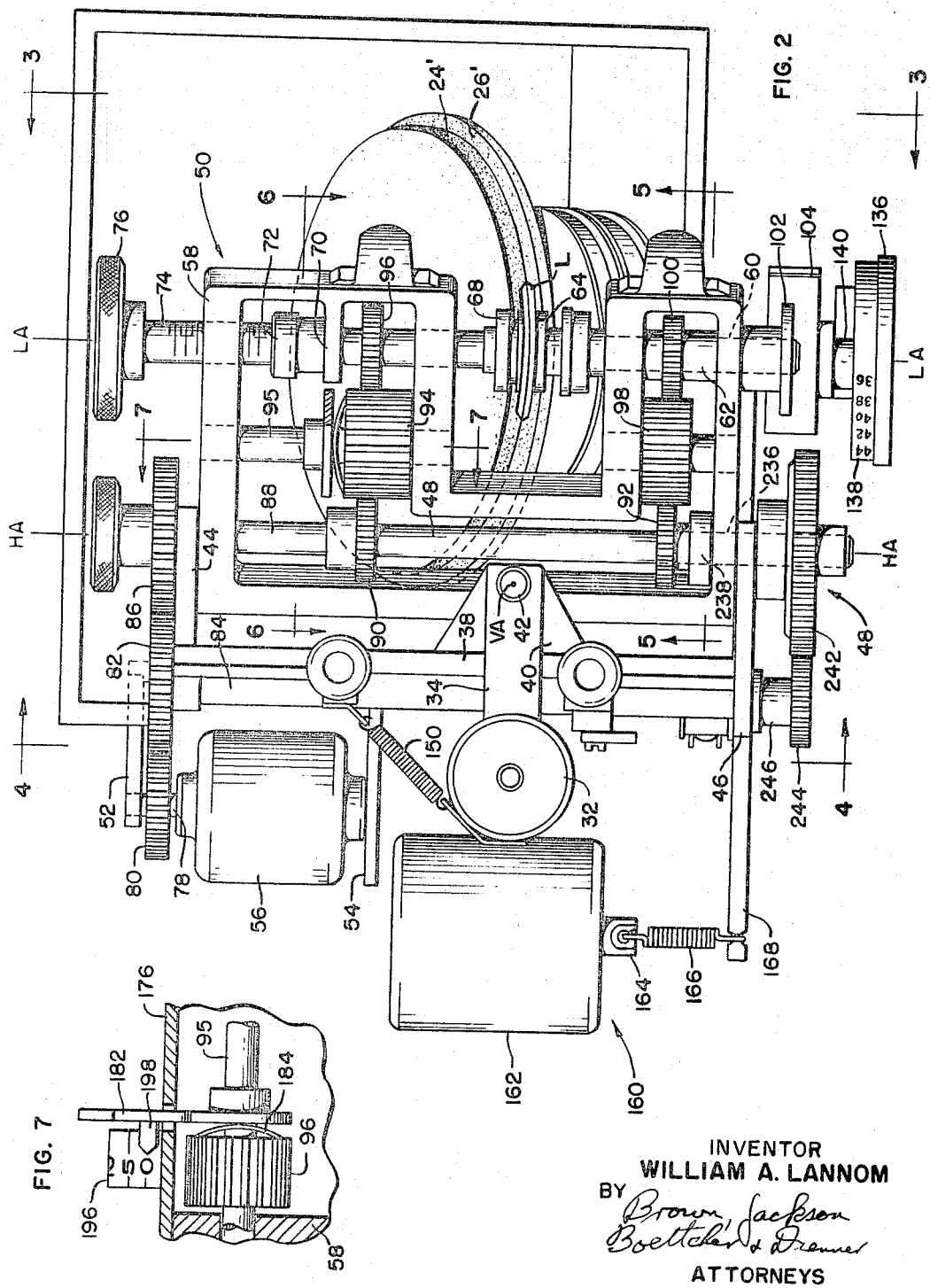

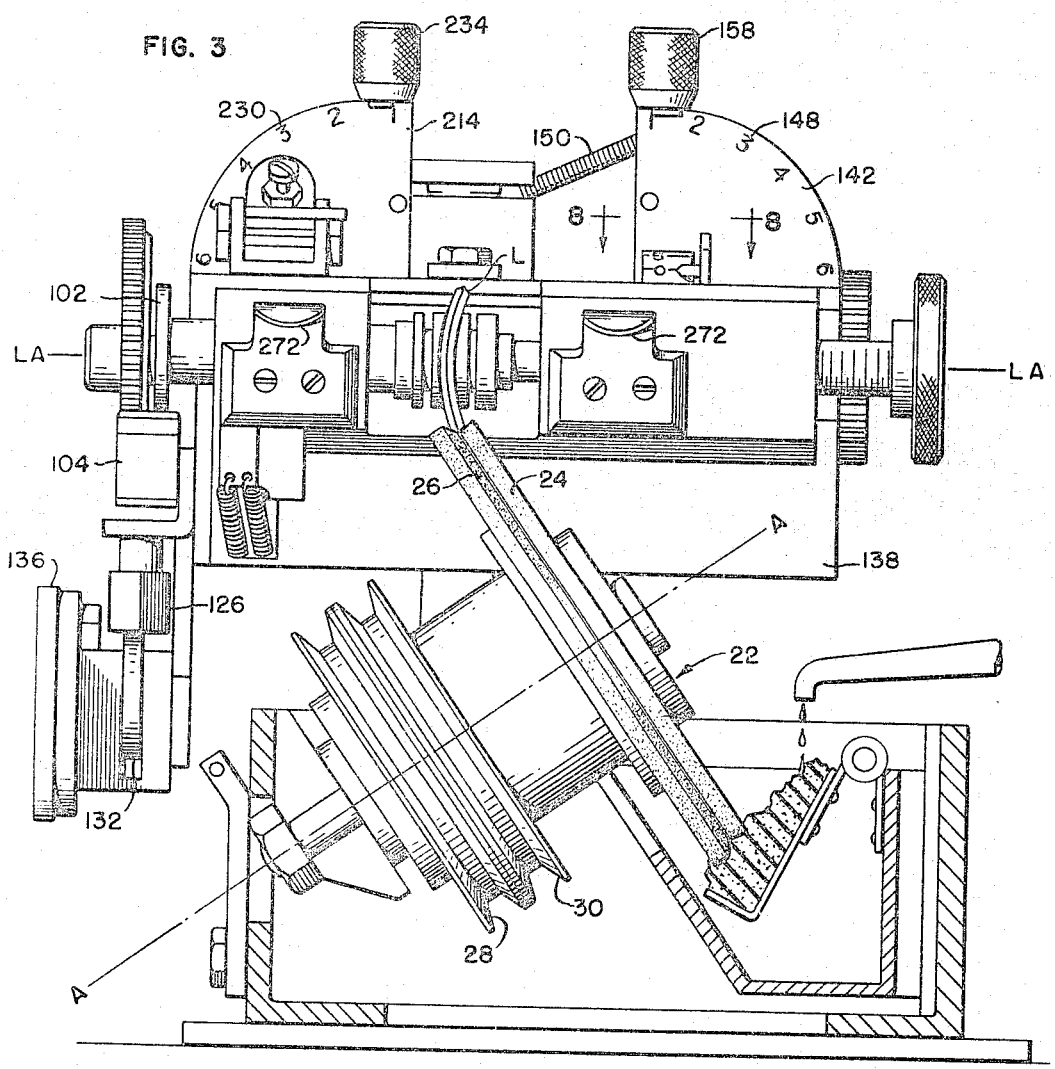
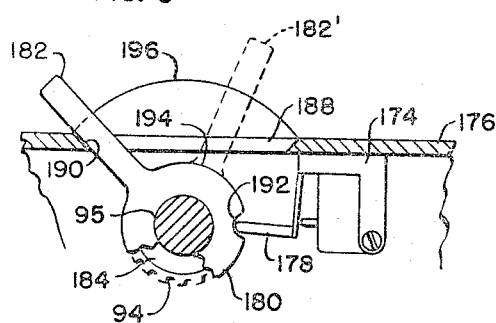
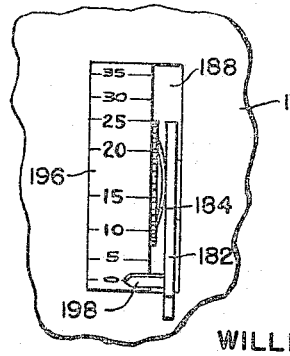

April 25, 1967  W. A. LANNOM  3,315,415
BEVEL EDGING DEVICE
Filed Aug. 11, 1964  4 Sheets-Sheet 4
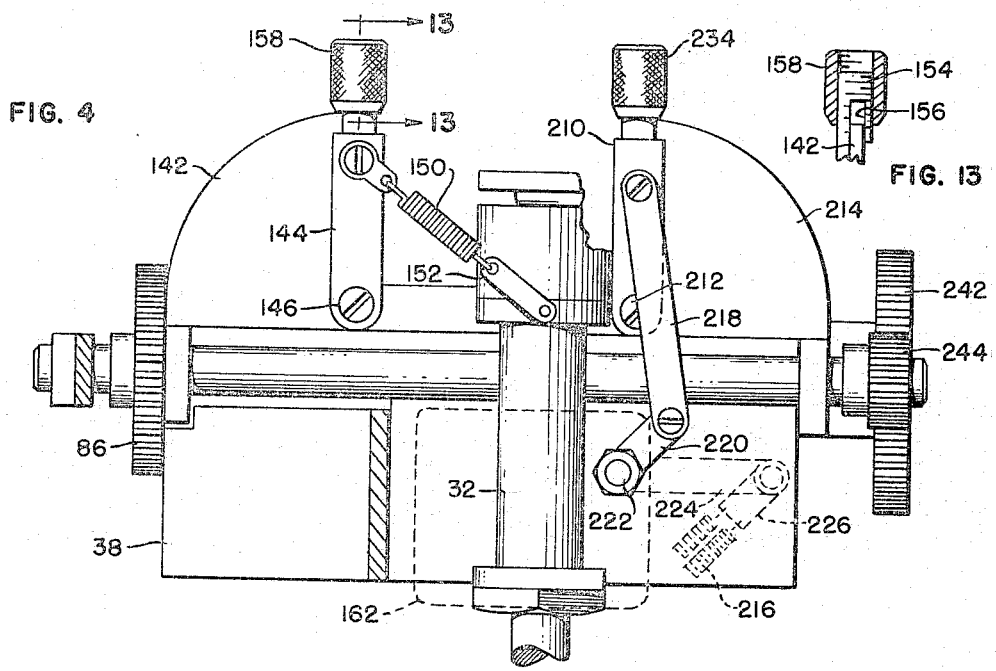
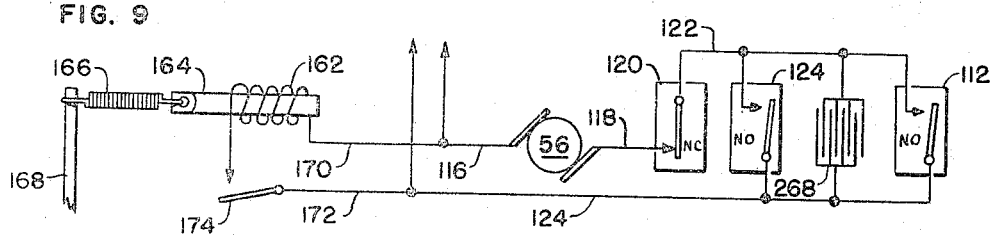
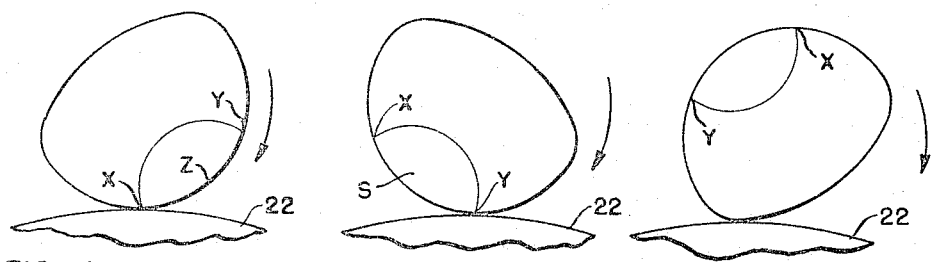
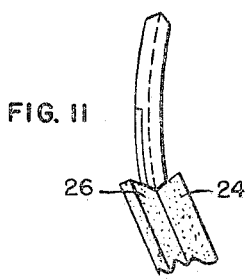
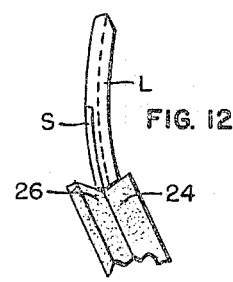
INVENTOR
WILLIAM A. LANNOM
BY Brown Jackson
Boettcher & Dienner
ATTORNEYS

United States Patent Office 3,315,415
Patented Apr. 25, 1967

3,315,415
BEVEL EDGING DEVICE
William A. Lannom, Blue Island, Ill., assignor of one-half to Edgar J. Schroth, Blue Island, Ill.
Filed Aug. 11, 1964, Ser. No. 388,824
9 Claims. (Cl. 51—97)

This invention relates to improvements in means and method of beveling articles such as ophthalmic lenses. More specifically, it relates to bevel edging multifocal lenses having a segment of harder material in one surface thereof and which extends through a portion of the lens perpihery only.

Commonly lenses have been edged by the abrading action thereon of appropriately located rotating abrading means, the lens being supported over the abrading means on a head adapted to swing about a horizontal axis located to one side of the contact of the lens periphery with the abrading means. The free end of the head rotatably supports a spindle which is turned about its horizontally disposed axis. This spindle is adapted to hold the lens with its axis coinciding with that of the spindle so that the lens edge is carried by the weight of the holder into contact with the periphery of the abrading wheel at the top of its revolution. Usually the spindle also supports a former or pattern having the shape to which it is desired that the lens be edged and beneath the pattern is a shoe which when engaged by the pattern closes a circuit to a motor also carried by the head and which is adapted to turn the spindle and thereby the lens and the pattern. At initial engagement of the lens edge with the periphery of the abrading wheel the pattern is out of engagement with the shoe and the motor does not operate. However, as soon as the portion of the lens edge contacting the abrading wheel has been ground to a size which allows the pattern to engage the shoe the motor is energized and turns the lens just sufficiently to present a new edge portion of the lens to the abrading wheel. When this occurs, the patern is of course, raised from the shoe, opening the circuit to the motor, and further rotation of the lens stops. This stopping and starting of the lens continues until the lens has completed a full revolution. Since the edge of the lens as thus rough ground will in effect comprise a plurality of small scallops, provision is usually made for turning the lens through one or more additional revolutions in order to produce a more finished edge on its periphery.

In my copending application, Ser. No. 214,739, filed Aug. 3, 1962, now U.S. Patent No. 3,210,890, issued Oct. 12, 1965, I disclose an improved construction of abrading means comprising a pair of abrading discs each having a peripheral surface of frusto-conical shape and which are arranged in juxtaposed spaced concentric relation so that the peripheral surface of each disc grinds only one side of the bevel. The discs are mounted also so as to rotate in opposite directions about an axis which is inclined at a relatively sharp angle to the horizontal axis of the lens supporting spindle. The angle of inclination is selected in accordance with the diameter of the two discs and such that in top plan the top periphery of the two discs approximates an arc corresponding generally to the base curvature of the ordinary and extraordinary ophthalmic lenses.

Advantageously, the radius through which the lens is free to turn about its horizontal axis is selected to approximate the radius of the abrading discs and the lens supporting head is also supported so that it is free to turn about a vertical axis spaced immediately behind said horizontal axis. Consequently, the lens may be mounted on the head so that the abrading action of the two discs follows the curvature of the lens and the apex of the bevel is appropriately centered between the two surfaces of the lens. By introducing a variable amount of tension on the lens supporting head in opposition to the free swing of the lens supporting head about said vertical axis, it is also possible to relocate the apex of the bevel as it forms on the lens periphery closer to or more remote from the front surface of the lens.

However, in edging ophthalmic lenses containing a multifocal segment of higher index material such as flint glass, when the segment is located adjacent the periphery of the lens but not through the thickness thereof, the flint glass being harder than the crown glass comprising the remainder of the lens, resists the abrading action of the discs and, because the lens supporting head is free to float about a vertical axis as aforedescribed, the immediate effect is that the grinding action is concentrated on the softer crown glass behind the harder flint glass segment. Consequently, along the portion of the lens periphery which contains the segment, the apex of the bevel will form forwardly of center and be at variance with the centering of the apex of the bevel through the remaining periphery of the lens which comprises only the softer crown glass.

The principal object of the present invention is to provide means and method of beveling the edge of multifocal lenses such as described which will overcome this difficulty and so that the apex of the bevel will be uniformly located between the surfaces of the lens throughout its full periphery.

Another object and feature of the invention is to provide means and method of beveling such multifocal lenses in which a temporary counterforce is introduced to offset this change in pressure and tendency of the grinding action to shift to the softer side of the lens edge when beveling a lens containing a multifocal segment of harder material in one surface thereof and along a portion of the lens periphery.

Still another feature and object of the invention is to improve upon existing constructions of lens edge beveling machines by providing means therein which will introduce additional pressure on the lens considered axially thereof and from its side opposite that containing the multifocal segment of harder glass but only during the interval when the portion of the lens periphery containing the segment is being abraded by the abrading means of the machine.

In the accomplishment thereof, my invention provides a coil spring or other resilient device connected between the horizontally swingable lens supporting head in a lens edging machine as described and the plunger of a solenoid fixed to the base of the machine on which said lens supporting head swings. The solenoid is connected into an electrical circuit so as to be energized by the closing of a normally open switch. In the open condition of the switch, the solenoid is inactive and the lens supporting head is free to swing horizontally to effect centering of the apex of the bevel being edged by the abrading means on the lens edge between its two surfaces. However, when the switch is closed, the energized solenoid draws its plunger inwardly to exert a tension on the coil spring which introduces a countering force which opposes the free horizontal swing of the lens supporting head. The switch is settable to its closed position and so that it will be returned to its normally open position in response to the intermittent rotation of the motor which turns the lens to effect the bevel edging of its full periphery.

In the illustrated form of the invention, this is accomplished by providing a switch actuating member adapted to be clutched by one of the gears through which the motor transfers its rotary motion to turn the lens supporting spindle. The switch actuating member is movable away from a stop in a direction opposite to that through which the gear turns to rotate the lens supporting spindle. Turning of the gear therefore effectively returns the switch actuating member to the stop beyond which it does not turn further with the gear. Upon engaging the stop, the switch actuating member is moved away from the stop, it closes the switch and the switch remains closed until the switch actuating member is returned to the stop. Therefore, if the lens is located on the supporting spindle so that its peripheral portion containing the multifocal segment is abraded first, and the switch actuating member is moved away from its stop an angular distance corresponding to that required of the gear to turn the lens supporting spindle equal to the peripheral extent of the segment, then during the interval the portion of the lens periphery containing the segment is edged, the solenoid will be energized and tension will be exerted countering free swing of the lens supporting head. The effect will be to force the harder segment into the bite of the abrading means so that it will be simultaneuosly edged as in the softer portion of the lens periphery. This effect will, however, be present only during the interval the portion of the lens periphery containing the segment is being edged. Once the switch actuating member has been returned to the stop which, if correctly set, corresponds with completing of the edge of the lens peripheral portion containing the segment, then the solenoid will be deenergized and the tension of the coil spring countering the horizontal swing of the lens supporting head will be relieved. Thereafter as the abrading machine continues to bevel the remaining periphery of the lens comprised entirely of the softer crown glass, the free horizontal swing of the lens supporting head will permit centering of the apex of the formed bevel between the two lens surfaces. Consequently, by exerting an appropriate amount of tension on the lens supporting head during the interval of edging the lens peripheral portion containing the multifocal segment, then the apex will be uniformly located between the two surfaces of the lens through its full periphery. It will be also appreciated that since the bevel shape is determined on the initial rough cut, in subsequent second and third revolutions of the lens, the previously formed apex will itself locate the lens periphery for the finish edging operations.

Thus a feature and/or object of the present invention is the provision, in a lens bevel-edging machine having a lens supporting head which is swingable about a vertical axis and includes a holder rotatable thereon about a horizontal axis so as to present the full periphery of the lens into bevel-edging relation with a suitably located abrading means, of resistance imparting means which are settable to resist the swing of the lens supporting head about said vertical axis through a determinable portion of the distance through which the lens is turned about the horizontal axis.

A further feature is the provision therewith of means operated by the motor which turns the lens for deactivating the resistance imparting means once the lens has been turned through said portion of the edging cycle.

A further feature and/or object of the invention is to provide means which will permit changing the length of said portion of the edging cycle during which the additional resistance imparting means is effective.

Still another object and/or feature of the invention is the provision in a bevel-edging machine as described of a pair of manually settable resistance-imparting means which act on the lens supporting head to resist its free swing about the vertical axis, the resistance of one said means being changeable in value to permit varying the location of the apex of the V-bevel edge on the lens relative to its two surfaces and the other said resistance-imparting means being selectively operable under the control of the motor which turns the lens holder about a horizontal axis so that it is released when the holder has been turned through a determinable portion of its rotation and which may be set so as to correspond to the arcuate portion of the lens periphery which the multifocal segment of harder glass occupies.

Many other objects, advantages and/or features of the invention will be apparent, or will become so, from the detailed description of a preferred embodiment of the invention which will now be described.

Referring therefore now to the several figures comprising the drawings wherein the parts are identified by like reference numerals:

FIGURE 2 is a top plan view of said edging machine with the cover plate of its lens supporting head removed and illustrates one location for the settable mechanism comprising the inventive device;

FIGURE 3 is a front elevational view partly in section taken along lines 3—3 of FIGURE 2, and looking in the direction indicated by the arrows;

FIGURE 4 is a fragmented rear view of the machine taken partly in section and along lines 4—4 of FIGURE 2 looking in the direction indicated by the arrows, showing the location of the solenoid in phantom lines;

FIGURE 6 is a fragmented vertical section view taken along lines 6—6 of FIGURE 2 looking in the direction indicated by the arrows;

FIGURE 7 is a fragmented vertical section view taken along lines 7—7 of FIGURE 2 looking in the direction indicated by the arrows and shows the solenoid energizing switch and associated switch actuating member;

FIGURE 8 is a top view of a fragmented portion of the lens supporting head and shows the switch actuating member and scale by which the machine is set to bevel edge the peripheral portion of a multifocal leans containing a segment of harder glass;

FIGURE 9 is a schematic view of the electrical circuit employed in the machine and by which additional tension is exerted on the lens supporting head during the interval of edging that portion of the lens periphery containing the segment of harder glass;

Figures 1, 5:
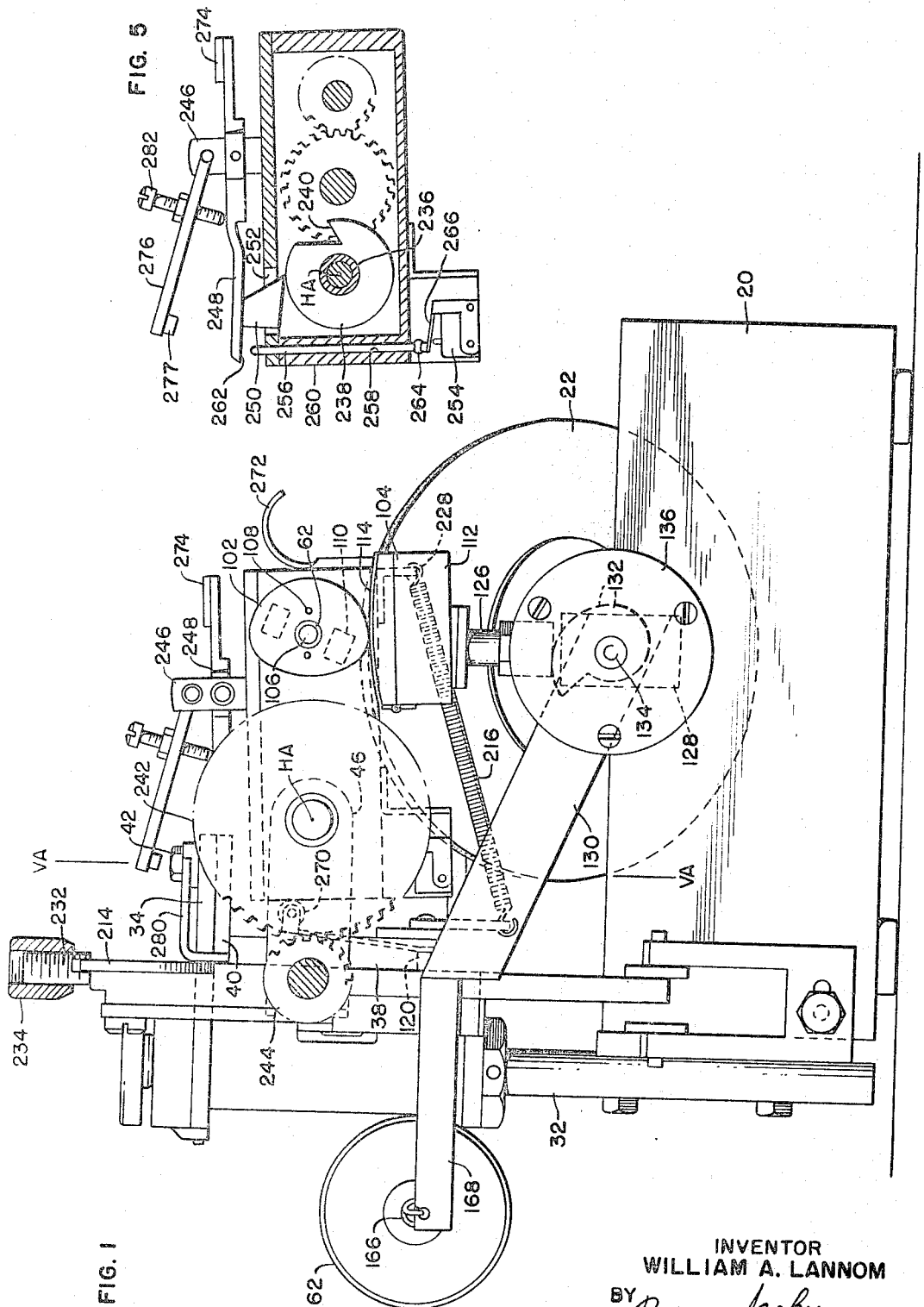
FIGURE 1 is a side elevational view of a bevel-edging machine in which the invention is embodied.
FIGURE 5 is a vertical section view taken along lines 5—5 of FIGURE 2 looking in the direction indicated by the arrows.

FIGURES 10a, 10b and 10c are a series of schematic representations of a multifocal lens showing its relation with the abrading means during the edging cycle; FIGURE 10a illustrating the angular disposition of the multifocal leans at the commencement of the edging cycle; FIGURE 10b illustrating the angular disposition of the lens upon completion of the edging of the peripheral portion which contains the segment of harder glass; and FIGURE 10c showing the angular disposition of the lens still later in the edging cycle;

FIGURE 11 is a schematic representation which illustrates how the lens edge is centered relative to the abrading discs in accordance with the invention during the bevel-edging of that portion of the lens periphery which contains the multifocal segment of harder glass;

FIGURE 12 is a schematic representation similar to FIGURE 11 which shows the effect when the counterforce provided by the invention is omitted during bevel-edging of the lens peripheral portion containing the multifocal segment; and FIGURE 13 is a sectional view taken along lines 13—13 in FIGURE 4 and illustrates a detail in the construction of the bevel apex setting means.

Referring now more specifically to the several views wherein like parts are identified by like reference numerals, the invention is illustrated as embodied in a lens edge beveling machine such as is shown and described in my copending application, Ser. No. 214,739, filed Aug. 3, 1962. However, it will be understood that the invention is not limited to a machine of the specific construction illustrated.

Now referring to FIGURES 1, 2 and 3, the illustrated lens bevel-edging machine is seen to comprise a base 20 of generally rectangular shape having front, bottom, rear and side walls and within which is rotatably supported abrading means indicated generally at 22 (FIGURE 3). In the illustrated embodiment the abrading means comprises a pair of adjacently located concentric discs 24 and 26 which are supported for rotation about an inclined common axis A—A and so as to turn in opposite directions about said axis. Disc 24 is associated with drive pulley 28 to turn clockwise and disc 26 is associated with drive pulley 30 to turn counterclockwise. Details in the construction of the abrading discs and the means of rotatably supporting them on base 20 are described in my copending application, Ser. No. 214,739, the description of which is intended to be included herewith by reference thereto.

Means for supporting a lens L over the oppositely rotating abrading discs 24, 26 so as to be edged on contact by the peripheral surfaces 24', 26' thereof will now be described. As shown in FIGURE 1, bolted to the rear wall of base 20 is a vertically disposed upright or post 32 which supports a pair of horizontally disposed spaced pivot-bearing members 34 and 36. Between said pivot-bearing members 34 and 36 is a vertically disposed mounting plate 38 having a pair of forwardly extending centrally disposed horizontal ears 40 one projecting from its upper and the other from its lower edge. These ears 40 slidably engage the adjacent surfaces of the aforementioned pivot-bearing members 34 and 36 to which they are respectively pivotally connected as by pins 42. In this manner, mounting plate 38 is arranged to turn about a vertical axis comprising said pins 42 indicated by line VA—VA. Rigidly attached to the two ends of mounting plate 38 as by screws or other appropriate connecting means are forwardly-extending parallel bearing plates 44 and 46 (FIGURE 2). In the forward ends of these two plates are aligned openings which constitute bearings for a two-part shaft indicated generally at 48. Shaft 48 defines a horizontal axis HA—HA about which an optical head 50 is mounted to swing freely. Optical head 50 is therefore free to swing through a vertical arc about axis HA—HA and also through a horizontal arc about axis VA—VA. Presently it is preferred that axis VA—VA be centered with respect to the high point of the abrading means 22 and at a distance therefrom approximately equal to the radius of the abrading discs 24, 26 which comprise said means 22 in the illustrated form of the invention. Vertical axis VA—VA is also located immediately rearward of horizontal axis HA—HA so that the movement of the optical head 50 is essentially universal by reason of the proximity of said two axes HA—HA and VA—VA. Also fixedly attached to mounting plate 38 are a pair of rearwardly extending parallel supporting plates 52 and 54 (FIGURE 2) between which is supported a motor 56 so as to turn with plate 38 about axis VA—VA. Motor 56 serves to rotate lens L in order to present its entire periphery to the abrading discs 24, 26 for the bevel-edging operation as will hereinafter be described.

Optical head 50, in horizontal plan, is of generally U-shape comprising a relatively wide leg portion 58 and a narrower leg portion 60 which lie above and straddle the high point of the abrading discs 24, 26 in the normal position of its use. The inner and outer side walls of its narrower leg portion 60 are provided with openings adjacent their forward end which constitute bearings for a spindle 62 extending through said walls and parallel to the aforementioned two-part shaft 48, its end protruding into the space between the two legs being provided with a resilient lens engaging pad 64. The wider leg portion 58 also supports a second spindle 66 having one end protruding through a provided opening in its inner wall and which end also is provided with a resilient lens engaging pad 68. A bearing plate 70 contained within said leg portion 50 rotatably supports the opposite end of spindle 66. Aligned with spindle 66 and coupled thereto by a slip connection 72 is a retractable shaft 74 threadedly connected into the outer wall of said leg 58. The outer end of shaft 74 has a knurled handle 76 by which shaft 74 may be threaded inwardly or outwardly so as to draw spindle 66 and its lens engaging pad 68 by reason of said connection 72 thereto toward and away from lens engaging pad 64 of the first mentioned spindle 62 to permit positioning and/or removal of a lens blank L therebetween. Instead of the indicated resilient lens engaging pads 64, 68 any other type of lens holders as are well known to the art, may be utilized.

Appropriately located gearing is provided whereby spindles 62 and 66 and thereby lens blank L supported between lens engaging pads 64, 68 are adapted to be turned by operation of motor 56. Referring to FIGURE 2, on arbor 78 of motor 56 is a gear 80 which meshes with gear 82 on shaft 84 so as to turn gear 86 on longer shaft part 88 of the previously mentioned two-part shaft 48 so as to simultaneously turn gears 90 and 92. Gear 90 meshes with gear 94 which is rotatably mounted on shaft 95, gear 94 in turn meshing with gear 96 to turn spindle 66. It will be understood, of course, that by reason of slip connection 72, spindle 66 is free to turn independently of retractable shaft 74. Simultaneously gear 92 on shaft 88 meshes with gear 98 on shaft 99 which engages with gear 100 to turn spindle 62.

Whe lens L is properly positioned between lens engaging pads 64 and 68, its geometrical axis will correspond with the axis of spindles 62 and 66, and its peripheral edge will be disposed between the frusto-conical abrading surfaces 24', 26' of the abrading means 22 adjacent the high point of said means 22. Preferably the axis of lens supporting spindles 62, 66 indicated by LA—LA (FIGURE 2) does not exactly intersect the axis of A—A about which the abrading discs rotate, but will be offset rearwardly therefrom by approximately 5 degrees. This has been found helpful to avoid lens chattering during the edging operation.

As previously mentioned, axis A—A about which the abrading discs 24, 26 rotate is inclined at a relatively sharp angle with respect to the axis LA—LA about which the lens is turned. In practice, it has been found that the angle between the two axes should approximate 35 degrees, that is axis A—A should be disposed at approximately 55 degrees to the horizontal. At the indicated angle of inclination the surfaces 24', 26' of the abrading discs define a curvature in the area of their contact with the edge of lens L very closely approximates the usual range of base curvatures of ophthalmic lenses. The angles of inclination of the cutting surfaces 24', 26' of the abrading discs 24, 26 are determined by the bevel which is to be ground on the lens edge. In practice it has been found that the included angle between the two sides of the bevel should be in excess of 90°. The presently preferred angle is approximately 110°. This is obtained by inclining surface 26' approximately 10° from the perpendicular to the axis of disc 26 and inclining surface 24' of disc 24 approximately 5° from parallel with its axis. When properly mounted, lens L, of course, will be disposed with its concave side directed toward the high end of the axis about which the abrading discs turn and so that its geometrical axis corresponds to the axis LA—LA about which spindles 62, 66 turn.

Best results are obtained in the edging operation when the distances between the lens supporting spindles and the horizontal and vertical axes about which the head 50 and thereby lens L swing are kept to a minimum length. Particularly good results have been obtained where the suporting head 50 has been so dimensioned that is axis HA—HA, which shaft 48 defines, lies in a vertical plane approximately intersecting the outer edge of the abrading discs which have a diameter of approxinately 6 inches. This means that the lens will be fed into cutting edges of the abrading discs by swinging about a horizontal axis approximately equal to the radius of the abrading discs. Vertical axis VA—VA about which the lens supporting head also swings in the edging operation is also disposed at about the same distance therefrom, although slightly rearwardly of axis HA—HA.

Means are also provided for starting and stopping rotation of the lens so that the lens blank may be edged to a particular shape. Such means, in accordance with the present invention, preferably comprise a former or pattern 102 selected to have the shape to which it is desired that the lens be edged and which is non-rotatably mounted on the end of lens supporting spindle 62 so as to turn therewith and to be fed into and out of engagement with a contact shoe 104 as the lens is rocked about axis HA—HA. Referring to FIGURE 1 the outer end of spindle 62 is shown provided with a reduced cylindrical end section 106 over which the suitably apertured pattern 102 seats. The end of spindle 62 is also provided with outwardly projecting pins 108 spaced about section 106 and which engage in provided openings of the pattern. These serve to properly align the pattern and to prevent its turning on section 106. Magnets 110 may also be provided in the end of shaft 62 to attract and hold the pattern in place. Where the pattern selected is of synthetic resin or other non-magnetic attractile material, a ring of magnetic metal may be placed over the outside of the former 102 which will be attracted by the magnets to hold the pattern in place. Contact shoe 104 comprises a normally open switch 112 (FIGURE 9) which is closed by the former 102 engaging arm 114 which is pivotally connected at one end and spring tensioned so as to be normally spaced free of the switch. Closing of switch 112 serves to complete a circuit to motor 56. As illustrated by FIGURE 9, said circuit comprises a line 116 which connects one side of the motor to a source of electrical power, the other side of the motor being connected by line 118, normally closed switch 120, line 122, the aforementioned normally open switch 112 and line 124 to the other side of the aforementioned electrical power source. It will thus be evident that as the lens periphery is initially brought into engagement with the frusto-conical surfaces 24', 26' of the abrading means 32, pattern 102 will be held by spindle 62 out of engagement with switch operating member 114. In this condition switch 112 is open and motor 56 is deenergized so that the lens does not turn. As the abrading discs continue to grind the contacted edge of the lens L, the lens is fed toward the discs by the force of gravity which rocks head 50 about shaft 48, (axis HA—HA). At some stage, enough of the lens edge will have been ground off in forming the bevel to carry the pattern 102 into engagement with arm 114 to close switch 112. This will complete the circuit aforementioned and motor 56 will start to turn the lens spindles 62, 66 through the gearing above described. This will cause the immediately adjacent and unground portion of the lens periphery to be next presented to the abrading edge surfaces of discs 24, 26. Head 50 then will be rocked upwardly about shaft 48 so as to raise pattern 102 out of engagement with contact shoe 114. Switch 112 therefore reopens, motor 56 stops and further turning of the lens ceases until this portion of its periphery has also been ground to where the pattern again engages the contact shoe to close switch 112 and repeat the process. This starting and stopping rotation of the lens continues until the lens has made a complete revolution, at which time it has been ground to the desired shape. Because of the edging procedure followed, it will be appreciated that what in effect is formed on the periphery of the lens is a series of small adjacent scallops. Conventionally, therefore, the lens is turned through one or more further revolutions to minimize the scalloped effect.

Means are also provided for controlling the size to which the lens may be edged in the process. Referring to FIGURE 1, contact shoe 104 is mounted on the upper end of a member 126 which is vertically slidable in the bore of cylindrical portion 128 at one end of support 130. Support 130 is fixed to the lower end of mounting plate 38 so that it swings with head 50 about vertical axis VA—VA but not about axis HA—HA. Engaging the underside of member 126 is a cam 132 mounted on shaft 134 having an externally located hand wheel 136 associated therewith. The lower end of member 126 rides on the periphery of cam 132 so that by turning wheel 136 contact shoe 104 may be raised or lowered. The spacing of contact shoe 104 from pattern 102 controls the size to which the lens will be ground in the bevel-edging process. As illustrated in FIGURE 2, hand wheel 136 is provided with a scale 138 and member 126 is provided with an index 140 cooperating with scale 138 which has been related to the varying diameter of cam 132 whereby it indicates the size of lens to which a lens will be ground at the height to which the contact shoe 104 is adjusted.

If head 50 is left free to swing about its vertical axis VA—VA, lens L will ride between the frusto-conical surfaces 24', 26' of the abrading discs and the resultant bevel will be formed with its apex substantially midway of the two lens surfaces. If it is desired that the apex of the bevel be other than so centered, this can be accomplished by introducing a countering force which resists free swing of the head 50 about its vertical axis VA—VA. Such means is illustrated in FIGURE 3 as comprising a quadrant member 142 secured to the right hand upper edge of the supporting plate 38. Referring now to FIGURE 4 which shows the reverse side of quadrant plate 142, lever arm 144 is illustrated pivotally connected at 146 to said rear side of the quadrant 142 so that it may be aligned with any one of the indicia of scale 148 marked along the arcuate edge of its front side (FIGURE 3). Connected to adjacent the upper end of said lever arm 144 is a spring 150 having its opposite end connected by appropriate means such as strap 152 to the upright support or column 32. Adjusting the position of arm 144 along the arcuate curvature of quadrant 142 will thus alter the tension of spring 150 to introduce a force which opposes but without inhibiting the free swing of head 50 about axis VA—VA, so as to locate the apex of the bevel being ground on the periphery of lens L closer to the front or convex side of the lens, and in proportion to the amount of force introduced by the setting of lever arm 144. The upper end of arm 144 is externally threaded at 154 (FIGURE 13) and has a slot 156 dividing it into bifurcations which straddle the arcuate edge of the quadrant plate 142. Threadedly connected on said end 154 of arm 144 is a cap 158 which when tightened causes the bifurcations to clampingly engage the quadrant and thereby set the position of arm 144 and the developed tension in spring 150.

In accordance with the invention, the described lens edging machine is provided with means indicated generally at 160 which adapt it for edging multifocal lens blanks. Such means comprise a solenoid 162 having a plunger 164 which is connected to one end of a spring secured by rod 168 to mounting plate 38 and function in opposition to the mentioned force introduced by spring 150 and associated lever 144. The temporary force introduced by means 160 effectively inhibits free-turning of optical head 50 about axis VA—VA but so as to move the apex of the forming bevel away from the front or convex side of the lens and toward its rear or concave side during the portion of the edging cycle the periphery of the lens containing a multifocal segment is being edged. For example, FIGURES 10, 11 and 12 of the drawing illustrate a lens L having a multifocal lens segment S of flint glass which is a harder material than the crown glass of which the remaining portion of lens L is constituted. Mutifocal segment S has the contour shape indicated in FIGURE 10 and comprises a portion of the periphery of the lens to be edged. However, segment S does not extend through the full thickness of the lens. Consequently, because optical head 50 is free to swing about axis VA—VA the tendency will be for most, if not all, of the beveling action to occur in the softer crown glass portion of the lens L behind the segment which offers less resistance. Consequently, as illustrated in FIGURE 12, the apex of the bevel will be nearer to, and may even run off, the edge of the front lens surface. This is of course at odds with the location of the apex of the bevel formed along the remainder of the lens periphery which because it is comprised of the softer crown glass through its full thickness will be more nearly midway of the two surfaces. The resulting irregular location of the apex is objectionable because the lens will not properly fit within the grooves of the receiving rims of the optical frame with which it is to be assembled. However, as will now be described means 160 provides a temporary force which acts to overcome resistance of the harder flint glass material of segment S whereby causing the edging action to locate the apex of the bevel more nearly midway of the two lens surfaces and as is illustrated by FIGURE 11.

Referring therefore to FIGURE 2, means 160 is seen to comprise the aforedescribed solenoid 162 having a plunger 164 to which one end of spring 166 is connected, the other end of spring 166 being connected to a rearwardly extending connection member 168 fixedly secured to one side of mounting plate 38 adjacent forward extending plate 130 (FIGURE 1). Solenoid 162 in turn is fixedly mounted to supporting column 32 (FIGURES 2 and 4). It will be apparent that when solenoid 162 is in an unenergized state, it will afford no resistance to the swing of optical head 50 about vertical axis VA—VA. However, when energized, solenoid 162 will draw its plunger 164 inwardly and so as to introduce a tensioning force through spring 166 on connection member 168. This resists the free swing of the optical head about axis VA—VA and so introduces a force on the lens L countering the freedom of head 50 and lens L to swing counterclockwise as when it meets the resistance of the harder glass content of segment S. The result is that as illustrated in FIGURE 11 the segment side of the lens will be forced into the bite of the abrading discs comprising means 22 so that the apex of the bevel will form centrally and midway of the two surfaces of the lens.

In accordance with the invention means are provided whereby the solenoid 162 will be energized only during that portion of the edging cycle when the peripheral edge of the lens containing segment S is in initial edging contact with surfaces 26′ and 24′ of the abrading means 22. Referring to FIGURE 9, one side of solenoid 162 is shown connected to power supply line 116 by line 170 the other side of solenoid 162 being connected by line 172 to supply line 124. Line 172 contains a normally open switch 174.

Referring to FIGURE 6, said normally open switch 174 is shown mounted on the underside of cover plate 176 of the optical head 50 so that it is immediately adjacent shaft 95 which rotatably supports transmission gear 94 (FIGURE 2). Also as shown in FIGURE 6, normally open switch 174 includes a spring tensioned actuating member 178 adapted to ride along the periphery of cam 180. Cam 180 is mounted to freely rotate about shaft 95; however, disposed between transmission gear 94 and cam 180 is a cup spring 184 which resiliently engages between gear 94 and cam 180 so that it effectively acts as a clutch. Therefore unless otherwise hindered, cam 180 rotates with gear 94 as it is turned by motor 56. Cam 180 also has a handle 182 which extends through a provided recess 188 in cover plate 176. Assuming gear 94 to be turning in a counterclockwise direction, the forward edge 190 of slot 188 serves as a stop against which handle 182 engages to limit the extent of rotation of cam 180 with gear 94. Referring still to FIGURE 6, it will be seen that switch actuator 178 engages the peripherally-disposed recess 192 of cam 180 when its handle 182 is against stop 190. In this condition, switch 174 is open and solenoid 162 is not energized. However, when handle 182 is moved clockwise about shaft 95 to a position remote from stop 190, as for example illustrated by dotted lines 182′ (FIGURE 6), switch actuator 178 is moved out of recess 192 to a position along the peripheral surface 194 of cam 180. In this condition, normally open switch 174 is closed and solenoid 162 is energized.

Referring now to FIGURE 8, cover plate 176 is provided with scale means at 196 alongside slot 188 therein and handle 182 has an indicator 198 which registers with scale 196. The indicia of scale 196 correspond to angular degrees through which gear 94 is turned to rotate lens L when supported on spindle 62, 66. Since gear 94 turns once for each full revolution of spindles 62, 66, then if one knows the number of degress through which lens L is turned to complete the edging of its periphery containing segment S, then handle 182 may be moved that far from stop 190 as determined by relating its indicator 198 with the appropriate indicia of scale 196, and so that solenoid 162 can be caused to remain energized through that fraction of one rotation of the lens corresponding to the peripheral extent of the lens segment S.

Thus referring to FIGURE 10a, if lens L is initially located on spindles 62, 66 so that its point X is first contacted by abrading means 22 at the start of the edging operation, and if handle 182 is moved away from stop 190 so that its indicator 198 is aligned with the indicia of scale 196, corresponding to the angular distance between X and Y (the peripheral extent Z of segment S), for example 20°, then solenoid 162 will be initially energized at the start of the edging operation and will remain energized until the lens has been rotated through said distance, that is until point Y has been edged by abrading means 22 (FIGURE 10b) which will correspond to the moment when handle 182 has been returned to stop 190 and so that actuator 178 again engages in recess 192 on the periphery of cam 180.

Consequently immediately after point Y on the lens edge periphery has been reached and ground to the required depth solenoid 162 will be deenergized and thereafter head 50 will be free to swing about its vertical pivot axis VA—VA except as inhibited by the particular setting of arm 144 relative to scale 148 or quadrant plate 142 and wherefore the apex of the bevel forming on the lens periphery will be substantially uniformly spaced between the lens' two surfaces throughout its full periphery. In the first full revolution of the lens, it is rough-ground to the required size and shape. It is, however, then finish-ground to reduce the scallops which are produced in the lens edge as a result of the intermittent stopping and starting of the lens rotation in the first rough grind. However, the location of the apex is already located in the first or rough cutting of the bevel and so that the lens edge remains properly centered between the surfaces 26′, 24′ of the abrading means 22 in the subsequent finish grinding without the necessity to introduce any compensating force as by again energizing solenoid 162.

Means are also provided whereby the downward pressure with which the lens is fed into the bite of the cutting edges 24′, 26′ of the abrading discs may be adjusted.

Referring to FIGURES 3 and 4, this is accomplished by means including a second lever arm 210 pivotally connected at 212 to the rear side of a second quadrant plate 214 generally similar to quadrant 142 but fixed to the left hand upper edge of mounting plate 38 as viewed in FIG- URE 3. Referring again to FIGURE 4, and considering it with FIGURE 1, lever arm 210 is seen to be adjustable about its connection 212 to vary the tension of a pair of coil springs 216 to which it is connected by a suitable linkage arrangement. This linkage arrangement comprises a first link 218 connected to arm 210 adjacent its upper end, link 218 in turn being pivotally connected to a second link 220 to which is fixed a shaft 222 so as to turn therewith. Shaft 222 extends through a suitable opening in plate 38, said opening constituting a bearing therefor so that movement of arm 210 will effect rotation of shaft 222 to turn a further link 224 located on the forward side of plate 38 which in turn is pivotally connected to one end of a link 226 having its other end connected to one end of the aforementioned pair of springs 216. The opposite end of springs 216 are connected by clip mean 218 (FIGURE 1) to the forward end of optical head 50. Therefore, in accordance with the setting of arm 210 along the periphery of quadrant plate 214, lens L may be caused to engage the cutting surfaces of abrading means 22 with more or less pressure. It will be appreciated that the tension of springs 216 is merely cumulative to the weight of head 50 in its swing about axis HA—HA, the minimum pressure exerted by lens L against the abrading surfaces of means 22 being that determined by the pull of gravity on head 50. The upper end 232 of lever arm 210 like arm 144 is also bifurcated on its under side so as to similarly straddle the arcuate curved side of quadrant 214 (FIGURE 1) and is externally threaded to receive a cap 234 which may be tightened thereon to hold arm 210 in any one of several positions to which it may be adjusted along scale 230.

The illustrated lens edging machine is also provided with means for automatically raising the lens out of the reach of the abrading discs at the completion of the edging cycle. Turning therefore to FIGURES 1, 2 and 5, two part rock shaft 48 as previously described, in addition to the longer shaft portion 88 on which is supported gearing through which rotary motion of the motor 56 is transmitted to turn lens supporting spindles 62, 66, also comprises a shorter shaft 236. Shorter shaft portion 236 is shown in FIGURE 2 having one end rotatable in the inner end of longer shaft 88 independently thereof and its opposite end rotatably seating in an opening provided therefor in the outer side wall of leg portion 60. Mounted thereon adjacent its under end is a cam wheel 238 having a V-notch 240 in its periphery (FIGURE 5). Short shaft 236 and thereby cam wheel 238 are arranged to be turned by motor 56 as it turns the lens supporting spindles 62, 66, although not at the same rate. For this purpose, a large gear 242 is shown in FIGURE 2 mounted at the outer end of shaft 236 which meshes with a smaller gear 244 on the end of shaft 245 (FIGURE 2) which is driven by motor 56 through meshing gears 80 and 82 as aforedescribed. The diameters of gears 242 and 244 are so selected that shaft 236 will be rotated at a rate substantially slower than the rate at which the lens L is turned. Preferably their diameters are so arranged that cam wheel 238 will make but one revolution each time spindles 62, 66 supporting lens L are rotated three times, this corresponding to the number of revolutions required of the lens to complete its one rough edge grinding and two finish grinding operations and representing the preferred edging cycle. If only one finish grinding operation is required, then the ratio between the gears 242 and 244 will be 2 to 1. Any other ratio may be provided to correspond with the number of revolutions required of the lens L to complete the edging operation. For example, if only the rough grinding step were required, then the diameter of gears 242 and 244 would be in a 1 to 1 ratio.

Turning now to FIGURES 1 and 5, on cover plate 176 of optical head 50 is a pivot bearing member 246 to which is pivotally connected a lever arm 248 intermediate its ends, said connection being spaced forwardly of axis HA—HA along which shaft 238 lies. Affixed to the under side of lever 248 so as to be to the rear of shaft 238 is wedge portion 250. Said wedge portion 250 protrudes through a provided opening 252 in said top cover plate 176 so as to ride the periphery of cam wheel 252 (FIGURE 5) and to drop into notch 240 as the cam wheel 238 completes a full revolution. Since cam wheel 238 is turning in a clockwise direction, it tends to pull the caught wedge portion 250 downwardly and away from a vertical plane including axis HA—HA of shaft 236, thereby rocking head 50 about axis HA—HA so as to raise the lens L out of edging contact with the abrading surfaces 24', 26' of the abrading means 22. This is on the assumption that motor 56 continues to operate. However, as aforementioned the operation of motor 56 is interrupted each time the former 102 is raised out of engagement with contact shoe 104. In order that the motor 56 will continue to operate after it has turned cam wheel 238 sufficiently to rock head 50 to a height that pattern 102 is lifted out of engagement with contact shoe 104, a second normally open switch 254 (FIGURES 5 and 9) is provided in parallel with switch 112 of the contact shoe 104. This second switch 254 is located on the under side of the optical supporting head 50 and adjacent its rear end so as to be actuated by a rod 256 extending through bore 258 in the rear wall 260 of head 50. Referring to FIGURE 5, the upper end of rod 256 protrudes above the surface of cover plate 176 so as to be engaged by end portion 262 of lever 248 as its wedge portion 250 drops into and is caught by notch 240 of cam wheel 238. The lower end of rod 256 rides on a roller 264 carried by a tensioned spring 266 operatively associated with switch 254. Therefore as the cam follower or wedge portion 250 is caught by the notch or recess 240 in cam wheel 238 rod 256 is also forced downwardly by end 262 of lever arm 248 against roller 264 causing spring 266 to close switch 254. Motor 56 therefore continues to operate even after switch 112 has been opened by movement of the former 102 away from shoe 104 in the rocking of head 50 away from the abrading means 22. A capacitor 268 shown in FIGURE 9 as connected across the circuit in parallel with said two normally open switches 112 and 254 serves to prevent arcing between the contacts in the operation of switch 254. Motor 56 therefore continues to rotate cam wheel 238 as well as the lens supporting spindles 62, 66 so that the power of motor 56 is used to rock the forward end of head 50 upwardly about axis HA—HA.

As previously mentioned, in series with normally open switches 112 and 254 is a normally closed switch 120 (FIGURE 9). Switch 120 is located on mounting plate 38 and includes a spring bearing roller 270 in position to be actuated by engagement with the rear wall of optical head 50 to open switch 120 as soon as head 50 has been rocked through an angle sufficient to locate the lens on supporting spindles 62, 66 at a height where it will be out of reach of the abrading means 22. Opening of switch 120 deenergizes motor 56 and further rotation of the lens and its supporting spindles is stopped until the head 50 has been again lowered to a position where switch 120 again closes. To disengage portion 250 from the notch 240 in cam wheel 238, the operator grasps head 50 by means of handles 272 and presses downwardly on the outer or free end 274 of latch lever 246. The optical head may be thereafter held in said inoperative raised position as for example to permit removing the lens L and/or replacing it with a new lens to be edged by catching portion 274 of lever 276 in opening 278 provided in a suitably located catch 280. Preferably adjustable means are also provided at 282 which abut the upper surface of the lever 246 so as to hold 276 at a height such that its portion 274 will be disposed above catch 280 in the various positions of the optical head 50 as its swings about axis HA—HA.

Although the operation of a lens edging machine constructed in accordance with the invention will be clear from the aforedescribed construction, arrangement and function of its component parts, to briefly review, at the start of the operation head 50 will be in its "up" position with latch 276 caught by means 277 in catch 280 and in which position wedge 250 will be withdrawn or only partially extending into recess 240 of cam wheel 238.

Assuming lens L to be bevel-edged is a multifocal lens having a flint glass segment S as illustrated by FIGURES 10 and 11, handle 182 (FIGURES 6 and 8) will be set so that its indicator 198 registers with the indicia of scale 196 which corresponds to the angular extent of the bifocal segment indicated at Z between points X and Y in FIGURE 10. If it is required that the apex be formed midway of the two lens surfaces, cap 158 on arm 144 will be loosened so that it may be aligned with the indicia 1 (upright position of arm 144). Cap 158 will be then retightened. If it is desired that the apex be formed closer to the forward or convex side of the lens, then arm 144 will be located at an appropriately higher indicia of scale 148 along the periphery of quadrant 142. Assuming also that arm 210 has been similarly set to provide the desired "down" pressure of the lens edge on the abrading surfaces 24′, 26′, a pattern 102 of required shape will be located on the end of spindle 62 by locating it over reduced section 106 and pins 108. Next wheel 136 will be adjusted relative to scale 138 (FIGURE 2) and indicator 140 to set the machine for the size of lens required.

Having made these adjustments, handle 76 will be turned to withdraw spindle 66 and its lens pad 68 far enough to allow insertion of the lens L. Lens L will then be positioned between the pads so that its geometrical axis will coincide with the axis of said spindle 62, 66, so that its concave side will face to the right of the illustrated views and toward the high end of axis A—A about which discs comprising the abrading means 22 rotate. Lens L also will be so located that point X (FIGURE 10) thereon which comprises the leading edge of the bifocal segment S will be positioned to contact the abrading surfaces 24 and 26 when the lens is lowered with head 50 into engagement therewith. Handle 76 will then be tightened until the lens is firmly in position. Assuming motor 56 is connected to the electrical power source and discs 24 and 26 comprising the abrading means 22 are properly rotating, the operator is then ready by grasping handles 272 and depressing lever 246 at 274 to dislodge portion 274 from catch 280 and carefully lower the head 50 until portion X of the lens edge engages between the rotating surfaces 24′ and 26′ of the abrading means 22. In this act the rear wall of head 50 will have been moved far enough away from roller 270 to allow switch 120 to close. However, motor 56 will remain deenergized until surfaces 24′, 26′ of the abrading means 22 have ground away a sufficient portion of the contacted periphery of the lens L at V to lower pattern 102 into engagement with contact shoe 104 so as to close switch 112 (FIGURE 9). Closing switch 112 will energize motor 156 just long enough to permit the lens to move through an angle sufficient to present its next adjacent unground portion to the abrading surface 24′, 26′. At that moment head 50 will again be rocked upwardly by the unground portion of the lens periphery. This raises the pattern 102 away from contact shoe 104, thus opening switch 112 and stopping further rotation of lens L. This stopping and starting of rotation of the lens continues until the full lens periphery has been rough-ground to the size and shape determined by the pattern 102 and height of contact shoe 104. Simultaneously, handle 182 is also moving back towards stop 190 as gear 94 turns each time motor 56 operates. Immediately after point Y representing the end of segment S along the lens edge periphery has been reached and ground to the required depth, as determined by the pattern and contact shoe, switch actuator 178 will enter recess 192 in cam 180 so as to open switch 174 deenergizing solenoid 162. Thereafter, head 50 will be free to swing about its vertical axis VA—VA, except as inhibited by the setting of arm 210 relative to scale 230 on quadrant plate 214. Assuming arm 210 to be set at zero, the apex of the bevel forming on the lens periphery L will be substantially centrally of the lens' two surfaces. After the lens has been turned through a full revolution, it will have been rough-ground to a size and shape as determined by pattern 102. However, the edging of the lens periphery will continue through one or more revolutions depending on the ratio of gears 242 and 244 and until cam wheel 238 has been rotated to a position where wedge portion 250 will drop into its notch 240. As previously pointed out, at that moment lever 246 will also close switch 254 so that the motor 56 will continue to operate and so power rock the optical head 50 about shafts 88–236 (axis HA—HA) as to raise its forward end and thereby locate spindles 62, 66 and lens L at a position above and remote from, and out of contact with, the abrading means 22. As soon as head 50 has been rocked through a sufficient angle so that its rear wall engages roller 270, switch 120 will also open and motor 56 will stop. Thereafter, head 50 may be further raised by grasping handles 272 to lift wedge portion 250 out of notch 240 in cam wheel 238 and so that portion 274 hooks in catch 280 so as to hold the head 50 in its "up" position for convenient removal of the now properly edged lens.

It will be also understood that the machine is useful for edging lenses which do not contain a multifocal segment or if they do contain a segment, it is not located partially through the periphery of the lens to be edged. In that event, then of course handle 182 will be retained in the illustrated position (FIGURE 6) adjacent stop 190 so that solenoid 162 will not be energized at all during the edging operation. The other steps and setting of the machine will, however, be performed as outlined above.

Handle 182 and its associated switch 174 and solenoid 162 therefore provide convenient and simply operated means by which the described lens bevel-edging machine may be adapted for bevel-edging lenses whose periphery is entirely of the same material as for example, ordinary simple focal lenses, and may be also easily set to bevel edge lenses having multifocal segments adjacent their periphery and of varying sizes. It will of course be understood that lens edging machines other than as described above and in my aforementioned copending application Ser. No. 214,739 may be similarly modified and/or adapted to introduce a temporary force which will appropriately locate the apex of the forming bevel through portion Z comprising the extent of the segment S to match the location of the apex of the bevel as formed on the remaining periphery of the lens.

From the foregoing description of the preferred forms of the invention it will be recognized that all of the recited features, objects and advantages of the invention have been demonstrated as providable in a machine of entirely practical, simple and economical construction.

Thus having described the invention, I claim:

1. In a lens bevel-edging machine, the combination of abrading means, a lens supporting head including a holder rotatable thereon and adapted to support a lens with its periphery in position to be bevel-edged by the abrading means, drive means to turn said lens holder through an angular distance sufficient that all of the periphery of the lens will be presented to the abrading means in an edging cycle, said head being swingable about a vertical axis, resistance-imparting means settable to resist the swing of the lens supporting head about said vertical axis through a portion of said angular distance, and means operated by said drive means which deactivate said resistance-imparting means after the lens has been turned through said angular portion of the edging cycle.

2. In a machine for bevel-edging work such as a lens, the combination of rotatable abrading means, a work supporting head swingable about a vertical axis and including a holder rotatable on said head adapted to support a workpiece forwardly of said axis with its periphery in position to be bevel-edged by the abrading means, drive means to turn said holder through an angular distance such that all of the periphery of the workpiece will be presented to the abrading means in an edging cycle, resistance-imparting means settable to resist the swing of the work supporting head about said vertical axis, means under the control of said drive means which limit the effect of said resistance-imparting means to a portion of the angular distance through which the holder is turned during said edging cycle, and means for adjusting the length of said angular portion of the edging cycle.

3. In a multifocal lens bevel-edging machine, the combination of rotatable abrading means adapted to bevel the edge of a lens presented thereto, a lens supporting head including an axially rotatable holder thereon adapted to support a lens with its periphery in position to be bevel-edged by the abrading means, drive means to turn said lens holder about its axis through an angular distance such that all of the periphery of the lens will be presented to the abrading means in an edging cycle, said head being movable in the direction of said axis so as to locate the apex of the bevel being edged on the lens between its two surfaces, and resistance-imparting means settable to resist said movement of the lens supporting head, through a portion of the angular distance through which the holder turns in an edging cycle, said drive means deactivating said resistance-imparting means after the lens has been turned through said angular portion of the edging cycle.

4. In a machine for bevel-edging a multifocal lens having a segment of harder material in one surface which interrupts a peripheral portion thereof to be edged, the combination of rotatable abrading means adapted to form a V-bevel on the edge of a lens presented thereto, a lens supporting head including an axially rotatable holder adapted to support a lens with its edge in position to be beveled by the abrading means, drive means to turn said lens holder about its axis through an angular distance sufficient to present all of the periphery of the lens to the abrading means in an edging cycle, said head being swingable about a vertical axis so as to locate the apex of the bevel-edge formed on the lens relative to its two surfaces, resistance-imparting means settable to resist the swing of the lens supporting head about said vertical axis, said resistance-imparting means being operably connected to said drive means so as to be deactivated when the holder has been turned through a portion of said angular distance corresponding to the arcuate portion of the lens periphery which said segment comprises.

5. In a machine for bevel-edging a multifocal lens having a segment of harder glass in one surface which interrupts a peripheral portion thereof to be edged, the combination of rotatable abrading means adapted to V-bevel the peripheral edge of a lens presented thereto, a lens supporting head mounted over said abrading means to swing about a vertical axis, an axially rotatable holder on said head spaced forwardly of said axis and adapted to support a multifocal lens as described in edgewise engagement with the abrading means, drive means including a motor to turn the holder through an angular distance sufficient to present the full periphery of the lens for bevel edging by the abrading means, a pair of manually settable resistance-imparting means which act on the lens supporting head to resist its free swing about said vertical axis, the resistance of one of said resistance-imparting means being adjustable in value to permit varying the location of the apex of the V-bevel edged on the lens between its two surfaces, the other of said resistance-imparting means being operably connected to the drive means so as to be released when the holder has been turned through a portion of said angular distance corresponding to the arcuate portion of the lens periphery which said segment comprises.

6. In a machine for bevel-edging a multifocal lens having a segment of harder glass in one surface which interrupts a peripheral portion thereof to be edged, the combination of rotatable abrading means adapted to V-bevel the peripheral edge of a lens presented thereto, a lens supporting head mounted over said abrading means to swing about a vertical axis, an axially rotatable holder on said head spaced forwardly of said axis and adapted to support a multifocal lens as described in edgewise engagement with the abrading means, drive means including a motor to turn the holder, a pair of resistance-imparting means which act on the lens supporting head to resist its free swing about said vertical axis, one of said resistance-imparting means being manually settable, and remaining in effect until manually released, the other of said resistance-imparting means being operably connected to the drive means so as to be released when the holder has been turned through a pre-set angular distance.

7. In a machine for bevel-edging a multifocal lens having a segment of harder material in one surface which interrupts a peripheral portion thereof, the combination of a base, abrading means rotatable thereon, a lens supporting head mounted on said base to swing about a vertical axis, an axially rotatable holder on said head forwardly of said vertical axis and adapted to support a multifocal lens as described in edgewise engagement with the abrading means, said abrading means being adapted to V-bevel the peripheral edge of a lens so presented to it, drive means including a motor and a train of gears drivingly connected between said motor and rotatable holder so that said holder turns with the rotation of said motor, a spring connected between said lens supporting head and the plunger of a solenoid device so as to impart resistance to free turning of the lens supporting head about said vertical axis when the solenoid is energized, an electrical circuit for energizing said solenoid device including a normally open switch located adjacent a gear of said train, a switch actuating member between said gear and switch, clutch means between said switch actuating member and said gear causing said switch actuating member to turn with said gear and thereby with the holder and lens supported thereby, a stop to inhibit turning of said switch actuating member, said switch being in open position when the switch actuating member engages said stop so that the solenoid device is deenergized and the spring exerts no resistance to said swing of the lens supporting head, and said switch actuating member being movable away from said stop so as to close the switch which energizes the solenoid device and causes the coil spring to resist free swinging of the lens supporting head about said vertical axis until the switch actuating member is returned to the stop by operation of the motor, the distance the switch actuating member is movable away from the stop being adjustable to correspond to the angular portion of the periphery of the lens to be edged which is interrupted by said segment of harder glass, said resistance imparted by the spring serving to counteract the resistance met by the abrading means in V-bevel edging said harder glass portion of the lens periphery.

8. In a machine for bevel-edging a multifocal lens having a segment of harder material in one surface which interrupts a peripheral portion thereof, the combination of a base, abrading means rotatable thereon, a lens supporting head mounted on said base to swing about a vertical axis, an axially rotatable holder on said head forwardly of said vertical axis and adapted to support a multifocal lens as described in edgewise engagement with the abrading means, said abrading means being adapted to V-bevel the peripheral edge of a lens so presented to it, drive means including a motor and a train of gears drivingly connected between said motor and rotatable holder, said holder turning with the rotation of said motor, means introducing a force to counteract free swing of the lens supporting head about said vertical axis when the peripheral portion of the lens including the segment of harder material is presented to the abrading means including an electromagnetic device, an electrical circuit for energizing said electromagnetic device including a normally open switch located adjacent a gear of said train, a switch actuating member between said gear and switch, and adapted to be releasably clutched by said gear so as to turn with said gear and thereby with the holder and lens supported thereby, a stop to inhibit turning of said switch actuating member when engaged thereby, said switch being in open position when the switch actuating member engages said stop so that the electromagnetic device is deenergized and said counteracting force introducing means does not affect free swing of the lens supporting head, said switch actuating member being movable away from said stop to close the switch to operate said electromagnetic device and introduce said counteracting force to the free swinging of the lens supporting head about said vertical axis until the switch actuating member is returned to the stop by operation of the motor, the distance the switch actuating member is movable away from the stop being adjustable to correspond to the angular portion of the periphery of the lens to be edged which is interrupted by said segment of harder glass, said force imparted by energizing the electromagnetic device serving to counteract the resistance met by the abrading means in V-bevel-edging said harder glass portion of the lens periphery.

9. In a machine for bevel-edging a multifocal lens having a segment of harder material in one surface which interrupts a peripheral portion thereof, the combination of a base, abrading means rotatable thereon, a lens supporting head mounted on said base to swing about a vertical axis, an axially rotatable holder on said head disposed forwardly of said vertical axis and adapted to support a multifocal lens as described in edgewise engagement with the abrading means, said abrading means being adapted to V-bevel the peripheral edge of a lens so presented thereto, drive means including a motor and a train of gears drivingly connecting said motor to said holder so that said holder turns with the rotation of said motor, a coil spring connected between said lens supporting head and the base, and means for tensioning said coil spring to introduce a force on said lens supporting head which will restrict its free turning about said vertical axis, said coil spring tensioning means including an actuating member located adjacent a gear of said train, said actuating member being movable from a first position where said tensioning means allows the coil spring to be in a relaxed state to a position remote therefrom where the tensioning means places the coil spring in a state of tension, and means associating said actuating member with said gear so that when the actuating member is moved to said remote position, it is caused to be returned by rotation of said gear to its first position where the tension on the spring is relaxed, the distance the actuating member is moved away from its said first position being adjustable so as to correspond to the angular length the portion of said segment of harder glass interrupts the periphery of the lens to be edged, the tensioning of the coil spring thereby serving to counteract the resistance met by the abrading means in V-bevel edging said harder glass portion of the lens periphery so as to effectively control the location of the apex of the V-beveled edge between the lens surfaces.

References Cited by the Examiner

UNITED STATES PATENTS 2,612,734 10/1952 Taig _____ 51—101
3,210,890 10/1965 Lannom _____ 51—101

ROBERT C. RIORDON, *Primary Examiner.*

D. G. KELLY, *Assistant Examiner.*